UNITED STATES PATENT OFFICE.

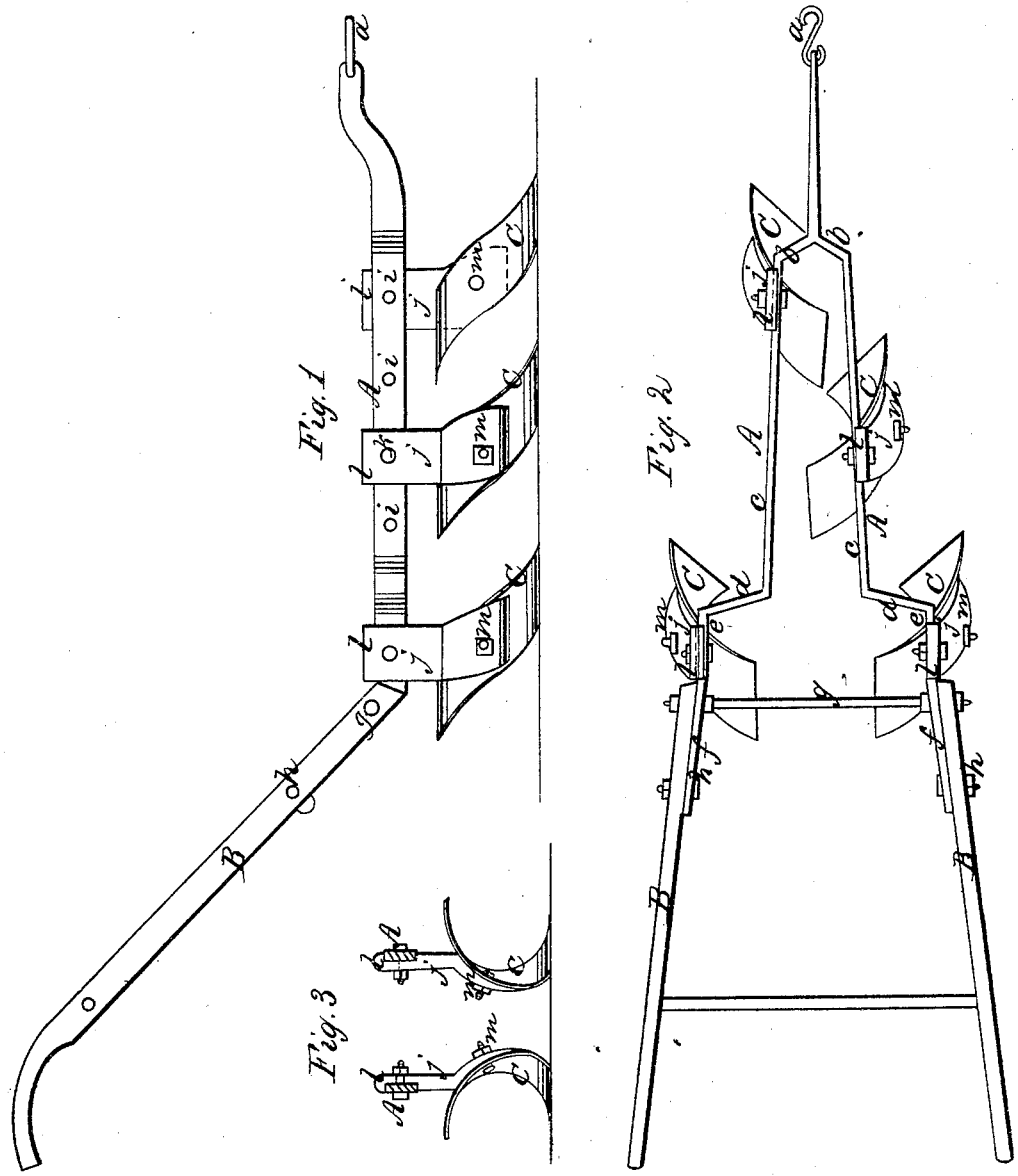

JOSHUA GIBBS, OF NEWARK, OHIO.

IMPROVEMENT IN CULTIVATORS.

Specification forming part of Letters Patent No. 18,739, dated December 1, 1857.

*To all whom it may concern:*

Be it known that I, JOSHUA GIBBS, of Newark, in the county of Licking and State of Ohio, have invented a new and Improved Cultivator; and I do hereby declare that the following is a full, clear, and exact description of the same, reference being had to the annexed drawings, making a part of this specification, in which—

Figure 1 is a side view of my improvement. Fig. 2 is a plan or top view of same. Fig. 3 is a view of two of the shares attached to the bars of the frame, so as to throw the earth outward at each side of the machine.

Similar letters of reference indicate corresponding parts in the three figures.

The object of the invention is to provide an implement which will be extremely durable, easily kept in repair, and one that may be adapted to all purposes or modes of culture practiced for hoed crops and plowing in small grain.

To enable those skilled in the art to fully understand and construct my invention, I will proceed to describe it.

A A represent two iron bars of rectangular form and of a proper size. The front ends of these bars are connected, and a hook, $a$, is attached thereto, to which the draft-chain or whiffletree is secured. The two bars A A are spread or bent out from each other a short distance from the extreme end where the hook $a$ is attached, as shown at $b\,b$, Fig. 2, and said bars then run slightly out of parallel a certain distance, as shown at $c\,c$, and are bent outward from each other, as shown at $d\,d$, and then are bent parallel with each other, as shown at $e\,e$. The bars are then bent obliquely upward, as shown at $f\,f$, and a handle, B, is attached to each part $f$. The two parts $f\,f$ are connected by a transverse iron bar, $g$, which gives a proper stiffness to the frame of the implement, which is comprised wholly of the bars A A and bar $g$. The bar $g$ passes through the lower ends of the handles and also serves to secure them to the frame. The upper ends of the parts $f$ are bent each at a right angle with the main parts, and have two or more holes made through, the bolts $h$ passing through either of said holes. The handles B, it will be seen, may be raised or lowered, as occasion may require, according as the bolts $h$ are adjusted.

Through the bars A A holes $i$ are made, and metal plates $j$ are secured to the bars by means of bolts $k$, which pass through the plates and also through the bars A. The upper ends of these plates are bent over, so as to form a lip, as shown at $l$, said lip bearing on the upper surfaces of the bars and serving to sustain the plates in proper position.

C represents the shares. These shares may be made of steel-plate, of an equal width during their entire length and bend or curve, so as to form a segment of a spiral thread; or they may be described as being curved, so as to form a portion of a thread of a screw about half of a revolution. The upper and lower ends of the shares have sharp cutting-edges. The shares are connected at their centers to the plates $j$ by bolts $m$. The lower parts of the plates $j$ are curved, so as to conform to the shape of the shares and allow the shares to fit snugly to the plates. The shares, by changing the plates $j$ from one side of the frame to the other, may be made to throw the earth either inward or toward the center of the implement or throw it outward from each side of the implement. In Fig. 2 the shares are adjusted to throw the earth inward. In Fig. 3 two shares are shown in the reverse position, so as to throw the earth outward from each side of the machine. Consequently it will be seen that the earth may be thrown either toward or from the plates, and when one cutting-edge of the shares becomes dull by use it may be reversed, the upper edges turned down, and the lower or dull edges turned up, so that fresh or new shares are in fact obtained. In consequence of the parts $c\,c$ of the bars A A being slightly out of parallel or made gradually to approach each other from their back to their front ends, the two front shares may, by being adjusted or moved on said parts $c\,c$, be brought nearer together or farther apart, as occasion may require.

By having the shares C constructed of the form described they may be readily kept in repair, for, when necessary, they may be detached with the greatest facility, sharpened or repaired, and attached again to the machine. More shares may be added to the machine by forming more bends on the bars. A A.

I am aware that adjustable and reversible shares have been heretofore used, and I do not claim broadly to be the inventor of them. I especially disclaim whatever there may be in my device which resembles any portion of J. L. Eastman's patent, June 30, 1836, R. H. Springstead's patent, February 12, 1845, and A. Leland's patent, January 2, 1849; but,

Having thus described my invention, I claim and desire to secure by Letters Patent—

As an improved article of manufacture, a cultivator constructed as herein described—viz., having its frame A made of wrought-iron in the form shown, with metallic-lipped plates $j$, made to slide longitudinally on the frame, the share C, of the form shown, attached to the plates $j$ by bolts $m$, and capable of being adjusted and reversed, all as specified.

JOSHUA GIBBS.

Witnesses:
L. S. BELL,
WM. SPENCER.